United States Patent [19]

Kunii

[11] 4,405,339

[45] Sep. 20, 1983

[54] PROCESS AND APPARATUS FOR GASIFYING COMBUSTIBLE MATERIALS

[75] Inventor: Daizo Kunii, Tokyo, Japan

[73] Assignee: Mittetu Chemical Engineering, Ltd., Tokyo, Japan

[21] Appl. No.: 288,358

[22] Filed: Jul. 30, 1981

[30] Foreign Application Priority Data

Aug. 7, 1980 [JP] Japan .............................. 55/107744
Mar. 19, 1981 [JP] Japan ................................. 56/38719

[51] Int. Cl.³ ............................................. C10J 3/56
[52] U.S. Cl. .................................. 48/62 R; 34/57 A; 48/77; 110/245; 201/31; 422/142; 422/145
[58] Field of Search ..................... 48/62 R, 77, 63, 64, 48/76; 422/142, 143, 145; 34/57 A; 110/245; 201/31; 266/172

[56] References Cited

U.S. PATENT DOCUMENTS

| | | | |
|---|---|---|---|
| 2,521,195 | 9/1950 | Wheeler, Jr. | 48/206 |
| 2,527,197 | 10/1950 | Rollman | 48/206 |
| 2,527,198 | 10/1950 | Rollman | 48/206 |
| 2,761,769 | 9/1956 | Elder | 422/143 |
| 3,902,856 | 9/1975 | Burroughs et al. | 422/142 |
| 4,213,938 | 7/1980 | Pyzel | 422/143 |
| 4,271,126 | 6/1981 | Marscholleh et al. | 422/143 |
| 4,324,620 | 4/1982 | Ito et al. | 48/206 |
| 4,337,066 | 6/1982 | Kunii | 48/63 |
| 4,338,283 | 7/1982 | Sakamoto et al. | 422/145 |

FOREIGN PATENT DOCUMENTS 55-22341  2/1980  Japan .................................. 422/142

Primary Examiner—William F. Smith
Attorney, Agent, or Firm—Kenway & Jenney

[57] ABSTRACT

A fluidized bed apparatus and a process for the gasification of combustible materials such as biomass heavy hydrocarbon oils and coal. Two or more separate reaction zones connected in series as a closed loop are formed within a tubular housing, through which a bed of particulate heat transfer medium such as sand continuously and successively recirculates while being maintained in the fluidized state. One of the reaction zones serves as a cracking zone for the combustible material and another one of the reaction zones serves as a heat-up zone for thermally regenerating the heat transfer medium by partial or complete combustion of char produced in the cracking zone.

7 Claims, 15 Drawing Figures

PROCESS AND APPARATUS FOR GASIFYING COMBUSTIBLE MATERIALS

BACKGROUND OF THE INVENTION

This invention relates to a process and apparatus for the gasification of a combustible material in the solid, liquid or slurry form.

In the gasification of a heavy hydrocarbon such as a crude oil, a reduced crude oil or a vacuum bottom, it is known to use an apparatus composed of two columns each containing a fluidized bed of solid particles. The feed stock oil is fed to one of the columns functioning as a cracking zone, where it undergoes thermal cracking by contact with the fluidized solid particles. The gas product is withdrawn from the cracking zone for recovery while the cracking residue is introduced, together with the solid particles, into the other column functioning as a heat-up zone, for combustion of the residue and for heating the solid particles. The solid particles, regenerated in the heat-up zone, are recycled to the cracking zone.

Although the gasification with the prior art apparatus can produce a gas of a high calorific value, the apparatus is large and complicated and is especially ill-suited for small-scale gasification.

SUMMARY OF THE INVENTION

It is, therefore, an object of the present invention to provide a simple, small-sized apparatus suitable for both large-scale and small-scale gasification of combustible materials.

Another object of this invention is to provide an apparatus of the above-mentioned type which may be operated with reduced energy consumption.

It is a further object of this invention to provide a process for the gasification of combustible materials using the apparatus of the above-mentioned type.

It is yet a further object of this invention to provide a process by which a gas of a high calorific value and a carbon monoxide gas or a water gas may be separately obtained.

In accomplishing the foregoing objects, there is provided in accordance with one aspect of the present invention an apparatus for the gasification of combustible materials, comprising:

an outer tubular housing member enclosing a bed of fluidized solid particles;

an inner tubular housing member placed inside of said outer housing member and coaxially aligned therewith to define a space therebetween;

at least two partition plate members extending axially between said outer and inner housing members for dividing said space into at least two angularly spaced compartments, one of said compartments acting as a cracking zone and another one of said compartments acting as a heat-up zone;

means extending axially within said inner housing member for dividing the inside space thereof into at least two channels, corresponding in number to the number of said compartments;

said inner housing member having at least two upper openings and at least two lower openings, each corresponding in number to the number of said compartments, at positions so that each one of said channels is in fluid communication with a corresponding compartment through one of the upper openings and with the compartment adjacent to said corresponding compartment through one of said lower openings, whereby said compartments are connected in series as a closed loop by said channels;

means for supplying fluidizing gases to said compartments and channels such that the solid particles in respective compartments and channels may be maintained in the fluidized state and in continuous recirculation through said closed-loop, successively up respective compartments and down respective channels, the fluidizing gas supplied to said heat-up zone containing oxygen;

means for feeding the combustible materials to said cracking zone, whereby the combustible materials are cracked in said cracking zone by contact with the bed of ascending solid particles to form a gaseous product and a carbonaceous material, said carbonaceous material being entrained with said solid particles and combusted, at least in part, in said heat-up zone by contact with the oxygen to heat the solid particles in said heat-up zone, the heated solid particles being recycled to said cracking zone for the utilization of their heat for effecting the cracking; and a discharge port for withdrawing the gaseous product from said cracking zone.

In another aspect of this invention, there is provided a process for the gasification of combustible materials using the above apparatus.

BRIEF DESCRIPTION OF THE DRAWINGS

Other objects, features and advantages of the present invention will become apparent from the detailed description of preferred embodiments which follows, when considered in light of the accompanying drawings, in which.

DESCRIPTION OF THE PREFERRED EMBODIMENTS

Figure 1:
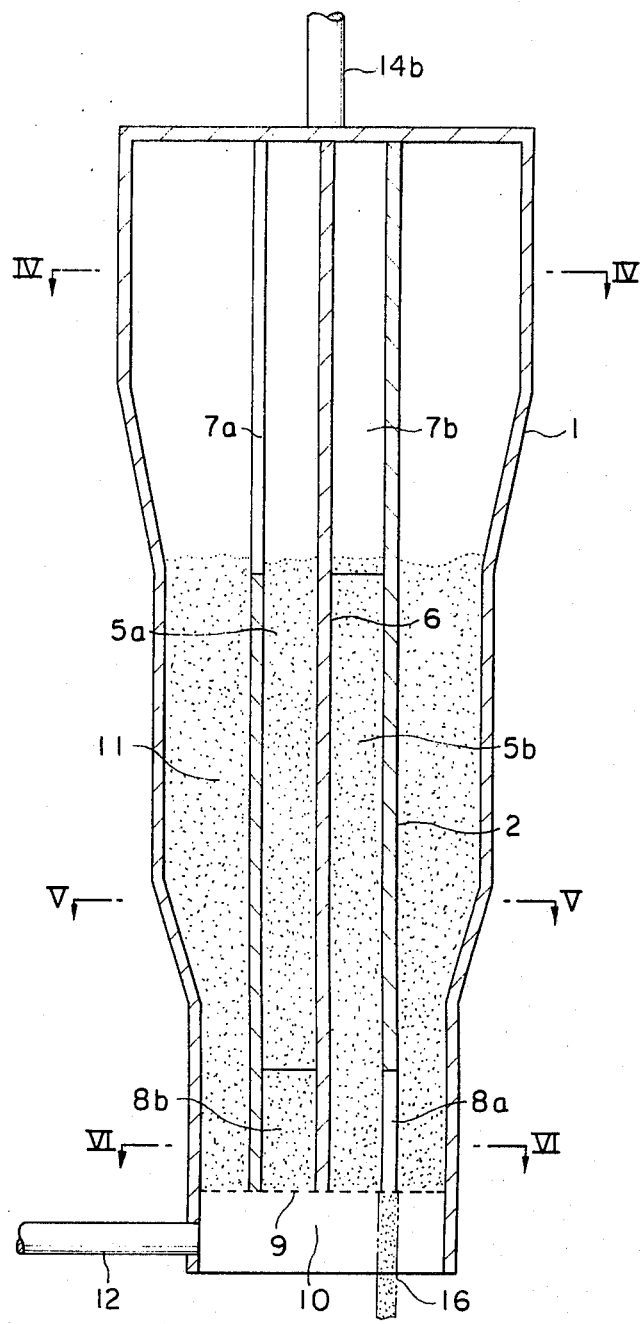
FIG. 1 is a cross-sectional, elevational view taken on line I—I of FIG. 3, diagrammatically showing one embodiment of the gasification apparatus with two reaction zones according to the present invention.
Figure 2:
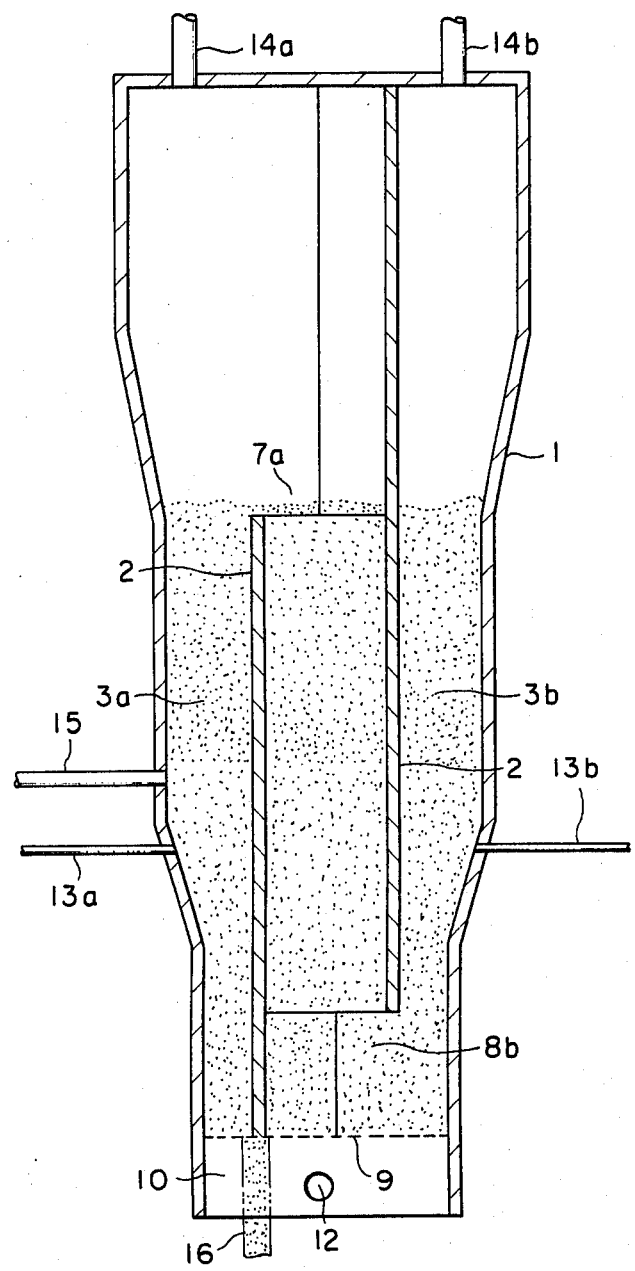
FIG. 2 is a cross-sectional, elevational view taken on line II—II of FIG. 3.
Figure 3:
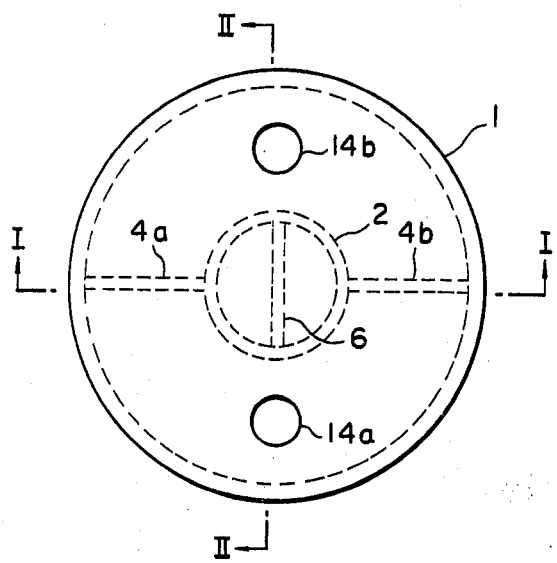
FIG. 3 is a schematic plan view of FIG. 1.
Figure 5:
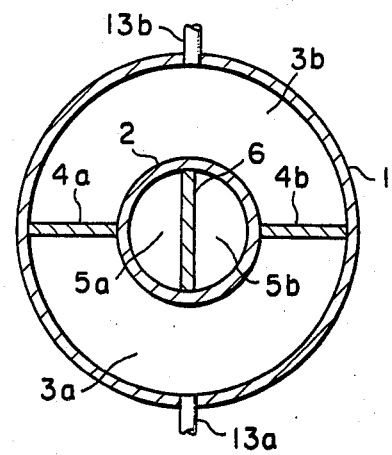
FIG. 5 is a cross-sectional view taken on line V—V of FIG. 1.
Figure 4:
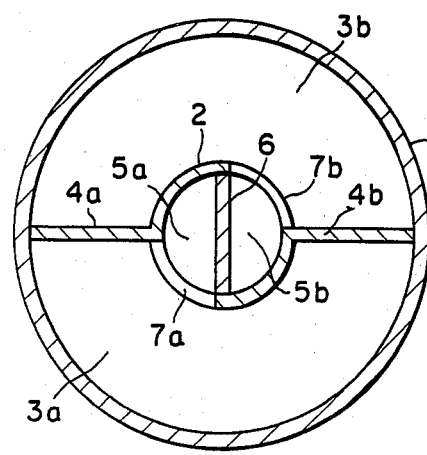
FIG. 4 is a cross-sectional view taken on line IV—IV of FIG. 1.
Figure 6:
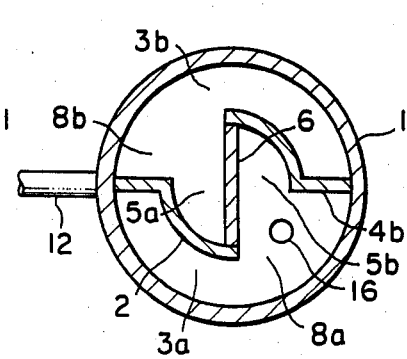
FIG. 6 is a cross-sectional view taken on line VI—VI of FIG. 1.

Referring to FIGS. 1 through 6, the reference numeral 1 denotes an outer, generally tubular, vertical housing member, preferably cylindrical in shape. An inner, generally tubular housing member 2, preferably cylindrical in shape, is placed inside of the outer housing member 1 and is generally coaxially aligned therewith, preferably concentrically, to define a space therebetween, preferably an annular space. The space is divided into angularly spaced compartments 3a and 3b by two axially extending partition plate members 4a and 4b. The interior of the inner housing member 2 is also divided into two channels 5a and 5b by an axially extending inner partition plate 6 such that each channel can adjoin both the compartments 3a and 3b.

As will be described in detail hereinafter, the compartments 3a and 3b serve as a cracking zone and a heat-up zone, respectively, each enclosing a bed of ascending solid particles maintained in the fluidized state. The channels 5a and 5b serve as passages or downcomers for the solid particles to allow the recirculation of the particles between the cracking and heat-up zones.

The inner housing 2 has two openings 7a and 7b at its upper end and two openings 8a and 8b at its lower end such that the compartment 3a is in fluid communication with the channel 3a through the upper opening 7a and is in fluid communication with the channel 5b through the lower opening 8a and that the compartment 3b is in fluid communication with the channel 5b at the upper opening 7b and is in fluid communication with the channel 5a through the lower opening 8b, whereby there is established within the interior of the outer housing member 1 a closed loop passage consisting of: compartment 3a—upper opening 7a—channel 5a— lower opening 8b—compartment 3b—upper opening 7b—channel 5b—lower opening 8a—compartment 3a.

Near the base of the outer cylinder 1 is provided a perforate distributor plate 9 below which a wind box 10 is located. A bed of solid particles 11 acting as a heat transfer medium is contained in the outer cylinder 1 and is supported on the distributor plate 9. A gas supply conduit 12 is connected to the wind box 10 for supplying a fluidizing gas to the compartments 3a and 3b and the channels 5a and 5b through the distributor plate 9 at such a pressure and a velocity as to maintain the solid particles supported on the distributor plate 9 in a weakly fluidized state. The distributor plate 9 controls the uniform flow of the fluidizing gas. Examples of a suitable fluidizing gas include steam, a nitrogen gas, a hydrogen gas and a carbon dioxide gas, a product gas obtained in the cracking zone. The use of steam is preferable because of its ease of separation from mixed gas products. A suitable fluidizing gas may be selected according to the kind of the combustible material and the intended gaseous product. Any particulate solid may be used as the solid particles constituting the fluidized bed as long as it may be maintained in the fluidized state at a temperature of 500°–1200° C. Illustrative of the solid particles are sand, alumina, coke, iron ore, silica, ground limestone, coal ash, sintered coal ash, cement clinker, bricks, magnesia, silica, alumina and other refractory materials. It is preferred that the solid particles have a mean particle size of 0.05–2 mm.

Gas supply ports 13a and 13b are provided at lower portions of the compartments 3a and 3b, respectively. A fluidizing gas which may be the same as or different from that supplied from the conduit 12 is supplied from the port 13a to the compartment 3a to ensure, in cooperation with the gas from the wind box 10, proper fluidization of the solid particles 12 in the compartment 3a. An oxygen-containing gas fed from the port 13b to the compartment 3b to maintain the bed of the solid particles contained therein in the fluidized state in cooperation with the gas from the wind box 10. The fluidized bed in each of the compartments 3a and 3b preferably has an average voidage of 0.4–0.85. The average voidage of the fluidized bed in each of the channels 5a and 5b should be maintained at a value 0.05–0.5 smaller than that in the compartments 3a and 3b and is preferably in the range of 0.35–0.75.

As a result of the closed loop arrangement and because of the difference in density between the fluidized beds in the compartments 3a and 3b and the channels 5a and 5b, the whole of the fluidized particles in the outer cylinder 1 may be continuously recirculated up the compartment 3a, down the channel 5a, up the compartment 3b and down the channel 5b, returning to the compartment 3a again.

Designated as 14a and 14b are gas discharge ports and 15 a feed line opening into the compartment 3a for feeding the combustible material to be gasified.

The gasification of combustible materials with above apparatus is carried out as follows. For start up, the solid particles within the apparatus are preheated so that the solid particles in the compartment 3b have a temperature of 700°–1200° C. Preheating may be done in any suitable manner, for example, by combusting a fuel in the compartment 3b with the use of a burner or by supplying a high temperature gas to the apparatus from the wind box 10. The combustible material to be gasified is then continuously fed through the line 15 into the compartment 3a where it is mixed with a mixture of the ascending particles, preheated in the compartment 3b, and the fluidizing gas and is heated by direct heat exchange with the ascending particles, thereby the combustible material is subjected to thermal cracking. The gasified components produced by the cracking, including a gas, liquor and tar, are withdrawn from the compartment 3a through the discharge port 14a while the cracking residue, which is generally composed of an ash and a carbonaceous material such as char, is introduced through the upper opening 7a into the channel 5a together with the fluidized particles cooled to 500°–1100° C. in the compartment 3a serving as the cracking zone. They descend through the channel 5a and flow into the bottom of the compartment 3b through the lower opening 8b. During their upward passage through the compartment 3b, the carbonaceous material and, if any, the starting material introduced thereinto without undergoing the cracking, are combusted with the oxygen-containing gas supplied from the gas supply port 13b. The combustion gas is withdrawn from the discharge port 14b. The ascending particles in the compartment 3b, serving as the heat-up zone, are heated to 700°–1200° C. and are introduced through the upper opening 7b into the channel 5b. Subsequently, the heated particles are returned to the cracking zone 3a for utilization of their heat for effecting gasification or cracking of the feed of the combustible material. The temperature of the bed in the heat-up zone is kept 20°–700° C. higher than that in the cracking zone.

In the heat-up zone, it is possible to obtain a product gas containing carbon monoxide (through a producer gas reaction) or a mixture of carbon monoxide and hydrogen (through a water gas reaction). In this case, carbon dioxide or steam is supplied to the heat-up zone together with oxygen and only a part of the carbonaceous material introduced into the heat-up zone is combusted; the other part of the carbonaceous material is reacted with the carbon dioxide or steam to yield carbon monoxide or a water gas.

When the combustible material to be treated is of a type which leaves incombustible residues, such as ash, after combustion, it is advisable to provide an outlet 16 for solids so that the amount of the residues can be maintained below a certain limit to ensure smooth transportation and fluidization of the solid particles. The outlet 16 is provided preferably at such a location that the discharge of the entrained carbonaceous material may be minimized.

Figure 7:
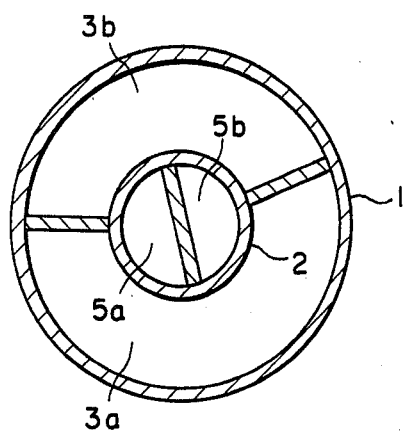
FIG. 7 is a cross-sectional, plan view, similar to FIG. 5, diagrammatically showing an alternate embodiment for the arrangement of the reaction zones.
Figure 8:
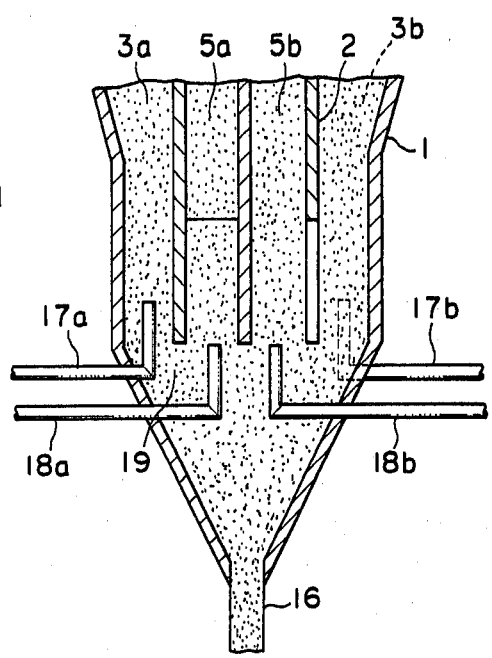
FIG. 8 is a partial, cross-sectional, elevational view diagrammatically showing an alternate embodiment for fluidizing gas supply means.

The above apparatus may be constructed in various forms. For example, the outer housing member 1 and, if desired the inner housing member 2 as well, may be formed such that the cross-sectional area is decreased toward the base of the apparatus, either continuously or stepwisely, so as to maintain proper fluidization in the compartments 3a and 3b. The cross-sectional area of the compartment 3a may be different from that of the compartment 3b, as shown in FIG. 7. FIG. 8 illustrates another embodiment of fluidizing gas supply means. In this variant, instead of providing the distributor plate 9, the wind box 10 and the common gas supply conduit 12, four fluidizing gas supply nozzles 17a, 17b, 17a and 18b are separately provided at the bottom of the compartments 3a and 3b and the channels 5a and 5b. A gap 19 is provided at the lower end of each of the inner housing member 2 and the bottom of the outer housing member 1. The bottom of the outer housing member 1 is formed into a funnel-like shape and is connected to an outlet 16 for the solid particles. Since the solid particles which can be fluidized in respective compartments 3a and 3b and the channels 5a and 5b are only those which are present above the tip of their associated nozzles, the recirculation is not inhibited by the provision of the gap 19.

Figure 9:
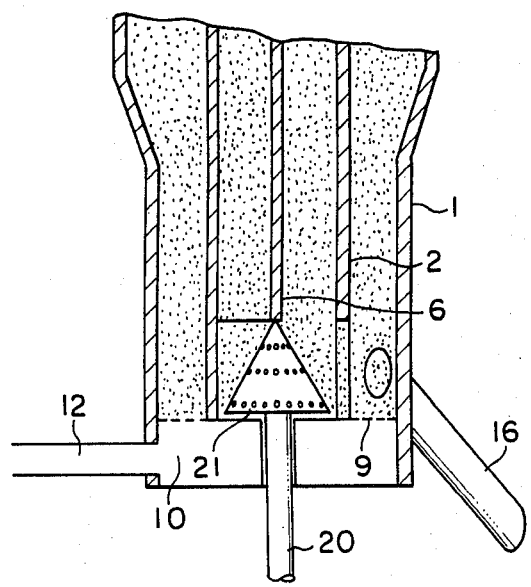
FIG. 9 is a partial, cross-sectional, elevational view diagrammatically showing a further embodiment for fluidizing gas supply means.
Figure 10:
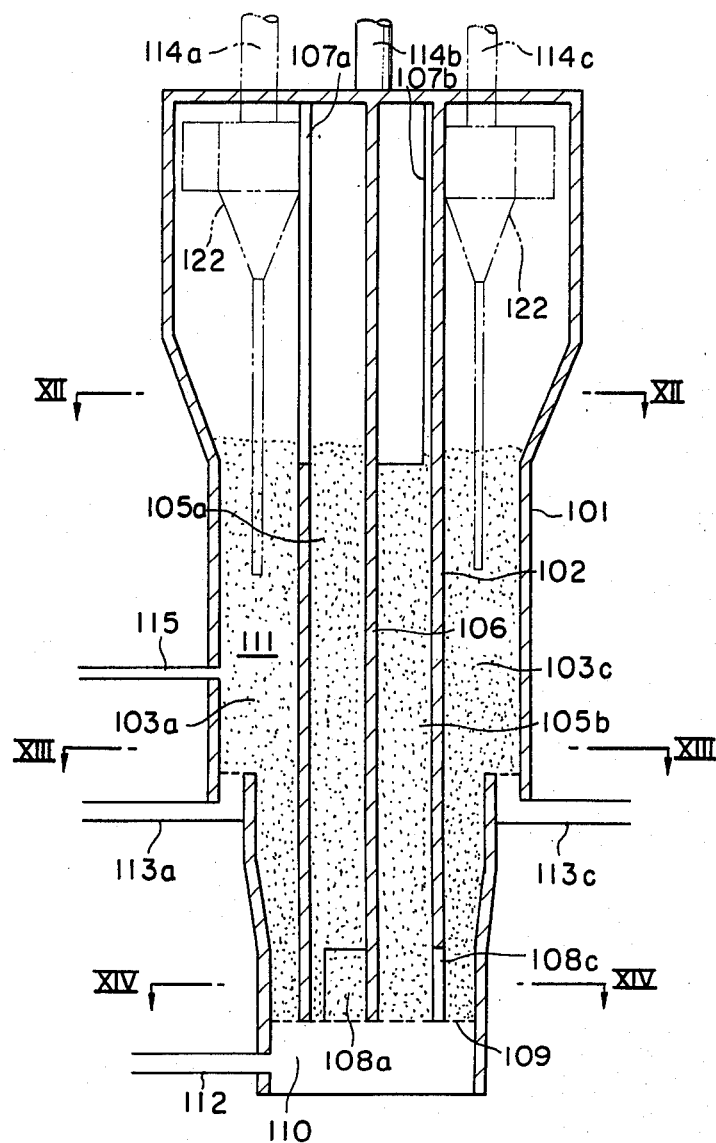
FIG. 10 is a cross-sectional, elevational view taken on line X—X of FIG. 11, diagrammatically showing an alternate embodiment of the gasification apparatus with three reaction zones.
Figure 11:
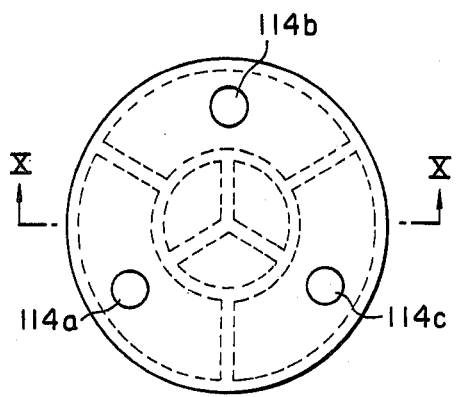
FIG. 11 is a schematic plan view of FIG. 10.

FIG. 9 shows a further embodiment of the fluidizing gas supply means. In this embodiment, the distributor plate 9 has annular perforated portion through which the fluidizing gas is admitted into the compartments 3a and 3b from the plenum space 10. A pipe, preferably a rotatable pipe 20 extends through the center of the imperforate portion of the plate 9. A conical, gas distributor 21 is connected to the pipe 20 for rotation therewith. The distributor 21 is provided with a plurality of holes through which a fluidizing gas, which is the same as or different from that supplied from the conduit 12, is injected into the channels 5a and 5b in directions which facilitate the passage of the solid particles in the channels 5a and 5b to the compartments 3a and 3b through the lower openings 8a and 8b. By rotating the pipe 20 with its axis as the axis of rotation, the fluidizing gas may be uniformly distributed to the channels 5a and 5b.

The invention has been described in connection with one embodiment in which two separate zones, i.e. cracking and heat-up zones, are provided within the single housing member 1. However, the invention may be embodied in other forms in which three or more compartments are formed in the annulus between outer and inner cylinders with their corresponding channels formed within the inner cylinder so as to perform three or more separate reactions in a single apparatus while recirculating a bed of solid particles successively and continuously through respective compartments.

Shown in FIGS. 10 through 14 is an alternate embodiment of the gasification apparatus of the present invention having three independent zones in unitary structure, in which corresponding parts have been designated by the same reference numerals as part of a "100" series.

The annular space defined between an outer cylinder 101 and an inner cylinder 102 is divided by three axially extending partition members 104a, 104b and 104c into three angularly spaced compartments 103a, 103b and 103c. The inner cylinder 102 is divided by axially extending dividing means 106 into three channels 105a, 105b and 105c such that each channel can face two adjacent compartments.

The inner cylinder 102 has three openings 107a, 107b and 107c at its upper end and three openings 108a, 108b and 108c at its lower end so that there is formed a closed loop passage for solid particles within the outer cylinder 101, consisting of: compartment 103a—upper opening 107a—channel 105a—lower opening 108b—compartment 103b—upper opening 107b—channel 105b—lower opening 108c—compartment 103c—upper opening 107c—channel 105c—lower opening 108a—compartment 103a.

A fluidizing gas supply conduit 112 opens into a wind box 110 formed below a perforated distributor plate 109 provided near the base of the outer cylinder 101 and supporting thereon a bed of solid particles 111. A similar gas as described hereinbefore is used as the fluidizing gas to be supplied from the conduit 112. Designated as 113a, 113b and 113c are gas supply ports, as 115 is a feed line for feeding a combustible material to be gasified, and as 114a, 114b and 114c are gas discharge ports each having a dust separator 112 located within respective compartments. Generally, the above-mentioned fluidizing gas is supplied from the port 113a, an oxygen-containing gas is supplied from the port 113b and steam, carbon dioxide or a mixture thereof is supplied from the port 113c. A solids outlet 116 may be provided for discharging a portion of the solid particles.

The above apparatus may be suitably applied for the production of a water gas and a hydrocarbon-containing gas, as separate product gas steams, from combustible materials. A combustible material is fed through the line 115 into the compartment 103a serving as a cracking zone, where it undergoes thermal cracking at a temperature of 500°–1000° C. by contact with ascending solid particles. The gas product is withdrawn from the gas discharge port 114a together with the fluidizing gas. The solid particles containing carbonaceous matters, such as char, and ash produced by the cracking are then introduced into the compartment 103b serving as a heat-up zone via the upper opening 107a, channel 105a and lower opening 108b, where a portion of the carbonaceous matter is combusted by contact with an oxygen-containing gas supplied from the port 113b. The combustion gas is discharged from the port 114b together with the fluidizing gas, while the ascending particles in the compartment 103b are heated with the combustion gas to a temperature 20°–700° C. higher than the cracking temperature and in the range of 800°–1200° C.

The heated particles which contain a residual amount of carbonaceous matter are passed through the opening 107b, channel 105b and opening 108c and are introduced into the compartment 103c serving as a water gas-forming zone, where the remaining carbonaceous matters reacts with steam at a temperature 20°–300° C. lower than the combustion temperature and 20°–600° C. higher than the cracking temperature and in the range of 700°–1100° C. to form a water gas. The gas product including hydrogen and carbon monoxide is withdrawn from the port 114c, while the solid particles are moved to the cracking zone through the opening 107c, channel 105c and opening 108c. Thus, the whole of the fluidized bed is continuously recirculated through the cracking zone, heat-up zone and water gas-forming zone. Heat is accumulated in the solid particles during their passage through the heat-up zone and is lost when they pass through the water gas-forming and cracking zones.

Gasification with the apparatus having three compartments has the following advantages. A substantially hydrocarbon-free water gas is obtainable, since any hydrocarbons introduced from the cracking zone into the heat-up zone will be combusted in the heat-up zone. Further, the use of air as the oxygen-containing gas in the heat-up step does not produce any problem of dilution by nitrogen of gas products in cracking and water gas-forming zones.

It is possible to use carbon dioxide in place of steam in the water gas-forming zone. In this case, the carbonaceous materials are converted into carbon monoxide rather than a water gas.

Figure 12:
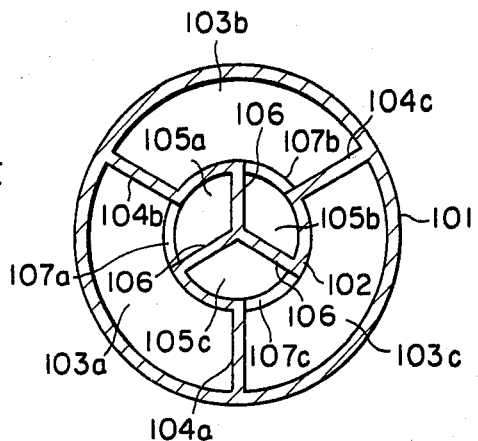
FIG. 12 is a cross-sectional, plan view taken on line XII—XII of FIG. 10.
Figure 13:
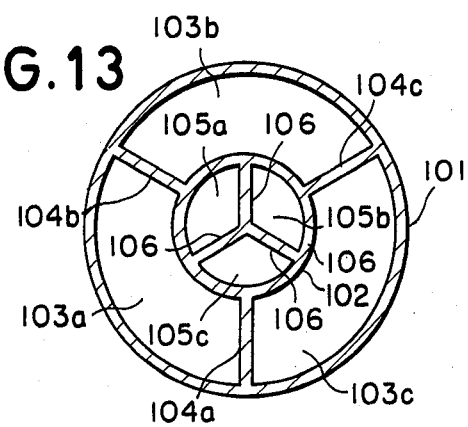
FIG. 13 is a cross-sectional, plan view taken on line XIII—XIII of FIG. 10.
Figure 14:
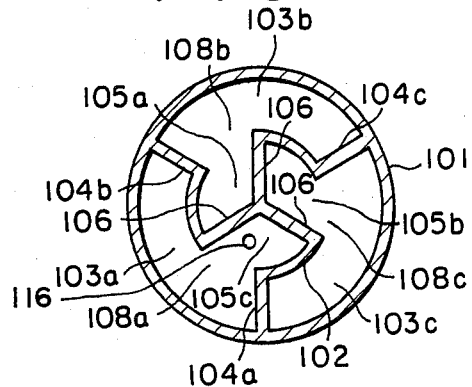
FIG. 14 is a cross-sectional, plan view taken on line XIV—XIV of FIG. 10.
Figure 15:
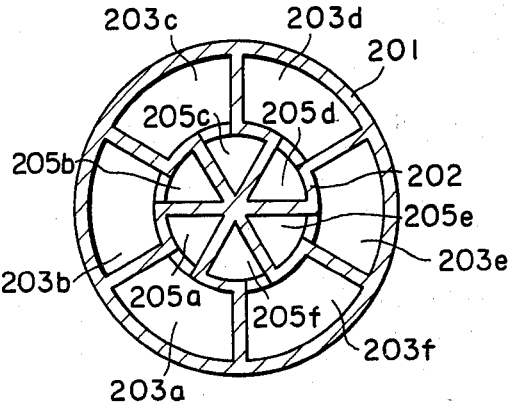
FIG. 15 is a cross-sectional, plan view similar to FIG. 13, diagrammatically showing a further embodiment of the gasification apparatus with six reaction zones.

FIG. 15 is a schematic representation, similar to FIG. 12, of the apparatus of the present invention having six compartments 203a, 203b, 203c, 203d, 203e and 203f formed between an outer cylinder 201 and an inner cylinder 202 with six channels 205a, 205b, 205c, 205d, 205e and 205f formed inside of the inner cylinder 202. This apparatus operates in a manner similar to that of the foregoing description.

As appreciated from the foregoing, the apparatus of the present invention is very simple in construction. Further, since the area of the outer surface of the apparatus is small, the loss of heat may be minimized. Moreover, by virtue of the contiguous arrangement of the compartments, heat transfer may occur not only by the recirculation of the solid particles but also through the partition plates. Therefore, the circulating rate of the solid particles may be reduced, with a corresponding reduction in operation costs.

The apparatus of the present invention may be used for the gasification of a variety of combustible materials. Illustrative of the combustible materials are heavy hydrocarbon oils such as heavy crude oils, reduced crude oils, heavy fuel oils, vacuum residues, pitch, tar, asphalt, deasphalted oils or spent oils; coal or related substances such as brown coal, lignite, grass peat, peat and debris; solid wastes such as municipal refuse; biomass; and coal-in-oil mixtures. Solid combustible materials are crushed or granulated to suitable sizes before they are fed to the gasification apparatus.

The following examples will further illustrate the present invention.

EXAMPLE 1

Using an apparatus similar to FIGS. 1–6, solid home refuse having the composition shown in Table 1 was gasified under the conditions shown in Table 2. The apparatus included an outer cylinder having a length of 1900 mm and inner diameters of 320, 240 and 180 mm at its upper, middle and lower portions, respectively, and an inner concentric cylinder having an inner diameter of 140 mm. As a heating medium constituting a recirculating fluidized bed, siliceous sand having a mean particles size of 0.40 mm and a density of 2.10 g/cm$^3$ was used. The home refuse which had been dried to have a moisture content of 5.1 % and crushed to have a mean particle size of 5 mm, was continuously fed to the apparatus at a feed rate of 9.8 kg/hr. The results are shown in Table 3.

TABLE 1

| Chemical Analysis of Refuse | |
|---|---|
| Inorganic matters | 24.2 wt % |
| C | 39.3 |
| H | 5.4 |
| O | 28.1 |
| N | 1.5 |
| S | 0.9 |
| Cl | 0.4 |

TABLE 2

| Gasification Conditions | |
|---|---|
| Flow rate of recirculating heating medium | 158 Kg/hr |
| Temperature of the fluidized bed in cracking zone 3a | 705° C. |
| Temperature of the fluidized bed in heat-up zone 3b | 824° C. |
| Fluidizing gas supplied from conduit 12 (feed rate) | Steam (1.62 Kg/hr) |
| Fluidizing gas supplied from port 13a (feed rate) | Steam (1.21 Kg/hr) |
| Fluidizing gas supplied from port 13b (feed rate) | Air (6.93 Nm$^3$/hr) |

TABLE 3

| Results | |
|---|---|
| Yield of gas product (dry gas) | 35.6 Nm$^3$/hr |
| Calorific value | 4290 Kcal/hr |
| Composition | |
| H$_2$ | 18.6 vol % |
| CH$_4$ | 15.4 |
| C$_2$H$_6$ | 2.9 |
| C$_2$H$_4$ | 10.4 |
| CO | 15.8 |
| CO$_2$ | 37.3 |

EXAMPLE 2

Dry rice hull having the composition shown in Table 4 was fed to the apparatus used in Example 1 at a feed rate of 5.95 Kg/hr for the gasification thereof under the conditions shown in Table 5, whereby to obtain the results shown in Table 6.

TABLE 4

| Composition of Chaff | |
|---|---|
| Moisture | 15.5 wt % |
| Ash | 12.2 |
| Volatile matters | 65.8 |
| Fixed carbon | 6.5 |

TABLE 5

| Gasification Conditions | |
|---|---|
| Flow rate of recirculating | 117 Kg/hr |

TABLE 5-continued

Gasification Conditions

| | |
|---|---|
| heating medium | |
| Temperature of the fluidized bed in cracking zone 3a | 1010° C. |
| Temperature of the fluidized bed in heat-up zone 3b | 1065° C. |
| Fluidizing gas supplied from conduit 12 (feed rate) | $N_2$ (1.58 $Nm^3$/hr) |
| Fluidizing gas supplied from port 13a (feed rate) | $N_2$ (0.37 $Nm^3$/hr) |
| Fluidizing gas supplied from port 13b (feed rate) | Air (5.85 $Nm^3$/hr) |

TABLE 6

Results

| | |
|---|---|
| Yield of gas product (dry gas) | 4.85 $Nm^3$/hr |
| Calorific value | 3025 Kcal/$Nm^3$ |
| Composition | |
| $H_2$ | 29.5 vol % |
| CO | 36.2 |
| $CO_2$ | 5.3 |
| $CH_4$ | 7.3 |
| $C_2H_4$ | 2.4 |
| $N_2$ | 19.5 |

EXAMPLE 3

A heavy oil having Conradson carbon residue of 7.5 % and a specific gravity of 0.883 g/$cm^3$ was gasified in the apparatus used in Example 1. Pitch coke having a mean particle size of 0.35 mm was used as the heating medium in place of siliceous sand. The feed stock oil was injected at a rate of 2.08 Kg/hr into the cracking zone through a spray nozzle. The gasification conditions and results were as summarized in Table 7 and Table 8.

TABLE 7

Gasification Conditions

| | |
|---|---|
| Flow rate of recirculating heating medium | 80.8 Kg/hr |
| Temperature of the fluidized bed in cracking zone 3a | 810° C. |
| Temperature of the fluidized bed in heat-up zone 3b | 838° C. |
| Fluidizing gas supplied from conduit 12 (feed rate) | Steam (1.25 Kg/hr) |
| Fluidizing gas supplied from port 3a (feed rate) | Steam (3.03 Kg/hr) |
| Fluidizing gas supplied from port 3b (feed rate) | Air (5.61 $Nm^3$/hr) |

TABLE 8

Results

| | |
|---|---|
| Amount of gas product (dry gas) based on amount of feed stock oil | 50.8 wt % |
| Amount of cracked oil based on amount of feed stock oil | 41.4 wt % |
| Composition of the gas product | |
| $H_2$ | 0.6 |
| $H_2S$ | 0.8 |
| $CH_4$ | 12.0 |
| $C_2H_6$ | 3.4 |
| $C_2H_4$ | 18.9 |
| $C_2H_2$ | 0.2 |
| $C_3H_8$ | 0.5 |
| $C_3H_6$ | 9.4 |
| $C_4$ | 4.7 |

EXAMPLE 4

Taiheiyo coal having a particle size ranging from 0.1 to 0.7 and the composition shown in Table 9 was gasified in the apparatus used in Example 1. Sintered coal ash was used as the heating medium. Feed rate of the coal was 3.95 Kg/hr. The gasification conditions and results were as shown in Table 10 and Table 11.

TABLE 9

Chemical Analysis of Coal

| | |
|---|---|
| Ash | 12.9 wt % |
| C | 67.0 |
| H | 5.4 |
| O | 13.1 |
| N | 1.3 |
| S | 0.2 |
| Calorific value (dry) | 6680 Kcal/Kg |

TABLE 10

Gasification Conditions

| | |
|---|---|
| Flow rate of recirculating heating medium | 138 Kg/hr |
| Temperature of the fluidized bed in cracking zone 3a | 605° C. |
| Temperature of the fluidized bed in heat-up zone | 975° C. |
| Fluidizing gas supplied from conduit 12 (feed rate) | Steam (1.73 Kg/hr) |
| Fluidizing gas supplied from port 13a (feed rate) | Steam (1.02 Kg/hr) |
| Fluidizing gas supplied from port 13b (feed rate) | $O_2$ (0.85 $Nm^3$/hr) and Steam (2.54 Kg/hr) |

TABLE 11

Results

| | |
|---|---|
| Product obtained from cracking zone 3a: | |
| Yield of gas product (dry gas) | 0.423 $Nm^3$/hr |
| Composition | |
| $H_2$ | 20.1 vol % |
| CO | 16.5 |
| $CO_2$ | 20.5 |
| $CH_4$ | 24.2 |
| $C_2H_4$ | 3.9 |
| $C_2H_6$ | 4.7 |
| $C_3$ | 6.6 |
| $C_4$ | 3.5 |
| Yield of tar | 1.10 Kg/hr |
| Yield of gas liquor | 0.19 Kg/hr |
| Total calorific value | 7055 Kcal/$Nm^3$ |
| Product obtained from heat-up zone 3b: | |
| Yield of water gas | 3.66 $Nm^3$/hr |
| Composition | |
| $H_2$ | 31.2 vol % |
| CO | 57.9 |
| $CO_2$ | 10.9 |

EXAMPLE 5

Using the apparatus shown in FIGS. 10-14, particulate coal having a mean particle size of 0.21 mm, an apparent density of 1.8 g/$cm^3$ and the composition shown in Table 12 was gasified under the conditions shown in Table 13. The apparatus was constructed of an outer cylinder having a length of 1150 mm and inner diameters of 105 mm at its upper portion and 80 mm at its lower portion, and an inner cylinder having an inner diameter of 48 mm. The heating medium, sand having a mean particle size of 0.21 mm was used. The coal was fed to the apparatus at a rate of 163 g/hr. To compensate for heat loss from the apparatus, an electric heater having maximum input of 19 KW was employed. The results are shown in Table 14.

TABLE 12

| Composition of Coal | |
| --- | --- |
| Volatile matters | 43.3 wt % |
| Fixed carbon | 39.1 |
| Ash | 12.7 |
| Moisture | 4.9 |
| Chemical Analysis | |
| C | 66.9 % |
| H | 5.7 |
| N | 1.1 |
| S | 0.1 |
| O | 13.2 |
| ash | 13.0 |

TABLE 13

| Gasification Conditions | |
| --- | --- |
| Flow rate of recirculating heating medium | 18.3 Kg/hr |
| Temperature of the fluidized bed in cracking zone 103a | 850° C. |
| Temperature of the fluidized bed in heat-up zone 103b | 930° C. |
| Temperature of the fluidized bed in water gas-forming zone 103c | 901° C. |
| Fluidizing gas supplied from conduit 112 (feed rate) | $N_2$ (420 $Nm^3$/hr) |
| Fluidizing gas supplied from port 113a (feed rate) | $N_2$ (219 $Nm^3$/hr) |
| Fluidizing gas supplied from port 113b (feed rate) | Air (314 $Nm^3$/hr) |
| Fluidizing gas supplied from port 113c (feed rate) | Steam (237 g/hr) |

TABLE 14

| Results | |
| --- | --- |
| Product from Cracking Zone 103a: | |
| Yield of gas product | 0.461 $Nm^3$/g coal |
| Composition of gas product ($N_2$-free basis) | |
| $H_2$ | 43.3 vol % |
| CO | 23.9 |
| $CO_2$ | 10.6 |
| $CH_4$ | 13.4 |
| $C_2$ | 7.8 |
| $C_3$ | 1.0 |
| Amount of gas product based on amount of coal feed | 30.4 wt % |
| Amount of gas liquor product based on amount of coal feed | 8.2 wt % |
| Product from Heat-Up Zone 103b: | |
| Amount of carbon combusted in heat-up zone | 29.8 g/hr |
| Composition of flue gas from heat-up zone | |
| $CO_2$ | 12.8 vol % |
| $O_2$ | 2.4 |
| $N_2$ | 84.7 |
| Product from Water Gas-Forming Zone 103c: | |
| Amount of water gas | 0.57 Nl/g coal |
| Composition of water gas ($N_2$-free basis) | |
| $H_2$ | 30.4 vol % |
| CO | 20.2 |
| $CO_2$ | 49.4 |
| $CH_4$ | 0.0 |

I claim:

1. An apparatus for the gasification of combustible materials, comprising:
   an outer tubular housing member for enclosing a bed of fluidized solid particles;
   an inner tubular housing member placed inside of said outer housing member and coaxially aligned therewith to define an annular space therebetween;
   at least two partition plate members extending along the length of said housing members and radially between said outer and inner housing members for dividing said annular space into at least two compartments, one of said compartments acting as a cracking zone and another one of said compartments acting as a heat-up zone;
   means extending axially within said inner housing member for dividing the inside space thereof into at least two channels, corresponding in number to the number of said compartments;
   said inner housing member having an upper openings and a lower opening for each of said compartments, said openings positioned so that each one of said channels is in fluid communication with a corresponding one of said compartments through one of said upper openings and with the compartment adjacent to said corresponding compartment through one of said lower openings, whereby said compartments are connected in series as a closed loop by said channels;
   means for supplying fluidizing gases to said compartments and channels so that the solid particles in the respective compartments and channels may be maintained in a fluidized state and continuously recirculated through said closed-loop, successively, up respective compartments and down respective channels;
   means for feeding the combustible materials to said cracking zone, whereby the combustible materials are cracked in said cracking zone by contact with the bed of ascending solid particles to form a gaseous product and a carbonaceous material, the carbonaceous material being entrained with the solid particles and combusted, at least in part, in said heat-up zone by contact with the oxygen to heat the solid particles in said heat-up zone, the heated solid particles being recycled to said cracking zone for the utilization of their heat for effecting the cracking; and
   a discharge port for withdrawing the gaseous product from said cracking zone.

2. An apparatus as claimed in claim 1, wherein said fluidizing gas supply means comprises a perforate distributor plate disposed near the bottom of said outer housing member to define a wind box therebelow and supporting the bed of fluidized solid particles thereon, a gas supply conduit opening into said wind box for supplying a first fluidizing gas to said compartments and said channels through said distributor plate, and gas supply port means provided in the vertical wall of said outer tubular housing for supplying additional fluidizing gas.

3. An apparatus as claimed in claim 1, wherein said fluidizing gas supply means comprises nozzle means, disposed at a lower portion of each of said compartments and channels, for injecting the fluidizing gases.

4. An apparatus as claimed in claim 1, wherein said fluidizing gas supply means comprises a distributor plate disposed near the bottom of said outer housing member to define a wind box therebelow and supporting the bed of fluidized solid particles thereon, a gas supply conduit opening into said wind box for supplying a first fluidizing gas thereto, said distributor plate having a perforated, annular portion so that the first fluidizing gas supplied to said wind box may flow into said compartments through said annular portion, a rotatable conical distributor, provided at lower portion of the inner housing and located at the center of and above said distributor plate, for supplying a gas to each of said channels, and gas supply port means provided in the vertical wall of said outer tubular housing for supplying additional fluidizing gas.

5. An apparatus as claimed in any one of claims 1 through 4, further comprising outlet means for discharging a portion of the recirculating solid particles.

6. The apparatus of claim 1 wherein the cross-sectional area at the top of said outer tubular housing is greater than at its base.

7. The apparatus of claim 1 wherein said compartment acting as said cracking zone is substantially larger than said compartment acting as said heat-up zone.

* * * * *

UNITED STATES PATENT AND TRADEMARK OFFICE
CERTIFICATE OF CORRECTION

PATENT NO. : 4,405,339
DATED : Sept. 20, 1983
INVENTOR(S) : Kunii

It is certified that error appears in the above—identified patent and that said Letters Patent is hereby corrected as shown below:

Col. 3, line 33, delete "3a" insert --5a--.
Col. 6, line 41, delete "112" insert --122--.
Col. 7, line 7, delete "matters" insert --matter--;
  line 15, delete "108c" insert --108a--.
Col. 10, line 65, delete "The" insert --As the--

Signed and Sealed this

Twenty-sixth Day of June 1984

[SEAL]

Attest:

GERALD J. MOSSINGHOFF

Attesting Officer    Commissioner of Patents and Trademarks